United States Patent
Brown et al.

(12)

(10) Patent No.: US 6,385,378 B1
(45) Date of Patent: May 7, 2002

(54) METHOD OF INSTALLING AN OPTICAL FIBRE UNIT IN A TUBE

(75) Inventors: George Henry Platt Brown, Galashiels; John Tansey, Warrington, both of (GB)

(73) Assignee: Emtelle UK Limited, Jedburgh (GB)

( * ) Notice: Subject to any disclaimer, the term of this patent is extended or adjusted under 35 U.S.C. 154(b) by 0 days.

(21) Appl. No.: 09/456,202

(22) Filed: Dec. 7, 1999

Related U.S. Application Data

(63) Continuation of application No. 08/983,068, filed on Apr. 7, 1998, which is a continuation of application No. PCT/GB96/01667, filed on Jul. 10, 1996.

(30) Foreign Application Priority Data

Jul. 12, 1995 (GB) .............................................. 9514204

(51) Int. Cl.⁷ ................................................. G02B 6/54
(52) U.S. Cl. ...................... 385/123; 385/100; 385/107; 385/136
(58) Field of Search ................................. 385/100, 107, 385/136, 137–139, 147; 294/86.42; 254/134.3 FT

(56) References Cited

U.S. PATENT DOCUMENTS

| 4,368,910 A | * | 1/1983 | Fidrych | .................... 294/86.42 |
|---|---|---|---|---|
| 4,411,409 A | * | 10/1983 | Smith | .................. 254/134.3 FT |
| 4,601,507 A | * | 7/1986 | Fallon | ...................... 294/86.42 |
| 4,892,442 A | | 1/1990 | Shoffner | ................. 405/154 C |
| 5,013,125 A | | 5/1991 | Nilsson et al. | ........... 350/96.23 |

FOREIGN PATENT DOCUMENTS

| DE | G-87 09 907.01 | 10/1987 | ............ H02G/1/08 |
|---|---|---|---|
| EP | 0 108 590 A1 | 5/1984 | ............ G02B/5/16 |
| EP | 0 186 753 A2 | 7/1986 | ............ G02B/6/44 |
| EP | 0 208 587 A1 | 1/1987 | ............ G02B/6/44 |
| EP | 0 345 968 A2 | 12/1989 | ............ C03C/25/02 |
| GB | 2152621 A | 8/1985 | ............ F16L/55/00 |
| JP | 63-124005 | 5/1988 | ............ G02B/6/00 |

OTHER PUBLICATIONS

P. Lesueur et al., "A New Application of Air Pulled Cabled in Microduct For The Local Loop," International Wire Cable Symposium Proceedings 1995, p.332–335.

* cited by examiner

*Primary Examiner*—Ellen E. Kim
(74) *Attorney, Agent, or Firm*—Darby & Darby

(57) ABSTRACT

A method for installing a lightweight optical fiber unit, preferably less than approximately 10 g/m, into a tube, by pulling the optical fiber unit through the tube using a pulling member. The pulling member may be attached to the optical fiber unit by a braided sheath. Alternatively, the pulling member itself may be a braided tube.

15 Claims, 2 Drawing Sheets

METHOD OF INSTALLING AN OPTICAL FIBRE UNIT IN A TUBE

CROSS-REFERENCE TO RELATED APPLICATIONS

This patent application is a continuation of U.S. patent application Ser. No. 08/983,068, filed Apr. 7, 1998, which is a continuation of PCT/GB96/01667, filed Jul. 10, 1996, which is incorporated herein by reference.

BACKGROUND OF THE INVENTION

1. Field of the Invention

This invention relates to a method of installing an optical fibre unit in a tube. The term "optical fibre unit" is used herein to describe an article which comprises a single optical fibre, or a plurality of optical fibres assembled to form a multi-fibre unit.

2. Description of Related Art

At the present time there are broadly two approaches to the in situ installation of optical fibre units in tubes. The first, and older, approach is to pull the fibre unit into the tube using an elongate pulling member. Fibre units which are to be installed in this way are heavyweight units/cables, and are provided with a substantial measure of reinforcement, for example by surrounding the fibre or fibre bundles with a rugged sheath, and/or using a steel, Kevlar, or similar strength member. ("Kevlar" is a Registered Trade Mark for a polyarylimide material). The philosophy behind this approach is that pulling exerts substantial forces on the optical fibre unit, and that such reinforcement is needed to withstand those forces. It must be borne in mind that the installation force within a fibre unit being installed by pulling increases progressively from the trailing end of the unit to the leading end. The theory has been that for the installation force at the trailing end to be sufficient, the force at the leading end must be so high that, in the absence of such reinforcement, the fibre will be damaged by it mechanically, or even if it survives mechanically, its optical properties will be adversely affected.

The second approach is to use a lightweight fibre unit and install it using a flow of fluid in a tube, preferably a flow of a gas, and more preferably, a flow of air. Such a method is described, for example, in EP-A-108590. Using a fluid has the effect that the propelling force exerted on the fibre unit is, at least in theory, substantially the same throughout its length, and this force is much less than the maximum force present in a fibre unit which is being installed by pulling. Accordingly, significant reinforcement of the fibre is not required, and indeed would be undesirable since it would increase the weight per unit length of the fibre and hence the fluid drag required to achieve installation.

However, although the blowing approach has attractions, and is being successfully used, it has a number of disadvantages. Thus, the distance over which, and speed with which, fibres can be installed is limited for any given tube diameter by the pressure drop and flow restrictions imposed thereby. Increasing the tube diameter to reduce these effects means that the tubes or bundles thereof occupy more space in the network and are thus more difficult to manage, particularly when a number of such bundles are present, for example at exchange buildings. Also, it arguably requires a more skilled installer than is needed when pulling is being used, and it requires more sophisticated installation equipment. Furthermore, this equipment is bulky and its use noisy, and it may be unacceptable to a customer to have this equipment brought on to his premises, should the end from which blowing is to take place be on those premises. Indeed, it may be physically impossible to locate the equipment there. Nevertheless, despite these disadvantages, blowing has been used increasingly, at least in the United Kingdom, for optical fibre unit installation.

JP-A-63-124005 (Sumitomo Electric Industries, Ltd.) describes a modification of the blowing method of EP-A-108590 for installing lightweight fibres. In this, in addition to exerting an installation force on the fibres by means of a flow of air, the fibres are also subjected to a pulling force. It is to be noted that the force exerted by the air is evidently substantial, since the air pressure quoted is 7 kg/cm$^2$, whereas EP-A-108590 stated that a pressure below about 5.6 kg/cm$^2$, usually below half that figure, had been found sufficient to install fibre members of up to 3.5 g/m over lengths of 200 m.

SUMMARY OF THE INVENTION

The present invention is based on the discovery that, provided the optical fibre unit is sufficiently lightweight, it can in fact be successfully installed substantially only by pulling, even in routes which are long and which include significant bends, because the low weight per unit length has the result that the required pulling force is below that at which the unit is likely to be damaged, or its optical properties impaired even at the leading end of the fibre. Accordingly, the fibre unit which is proposed herein to be installed by pulling should not include any reinforcement which would have the effect of substantially increasing the weight of the fibre, though, as explained below, it may have lightweight reinforcement.

Thus, according to one aspect of the invention there is provided a method of installing an optical fibre unit in a tube, in which the fibre unit is a lightweight fibre unit, and at least substantially all of the installation force is provided by attaching a pulling member to one end thereof and exerting a pulling force thereon.

The use of pulling not only avoids the disadvantages of blowing referred to above, but generally enables a much higher installation speed to be achieved than is achievable under corresponding conditions using blowing.

The fibre unit preferably has a weight of not more than 10 g/m, and more preferably less than 10 g/m, still more preferably not more than 5 g/m, and for a low fibre count of, say, 8 fibres, is preferably not more than 2 g/m. For a 4 fibre unit might be as little as 0.7 to 0.8 g/m.

The fibre unit may have a protective sheath thereon, for example of an acrylate curable by ultraviolet light, optionally containing particulate matter as described in EP-A-345968 (incorporated herein by reference), to which attention is directed for further details. The fibre unit described in EP-A-345968 is particularly advantageous for present purposes, as the surface thereof, which has protuberances therein as a result of the particulate matter, has been found to provide significantly less resilience to pulling than would otherwise be the case. Materials other than UV-curable acrylate may, however, be used, for example high density polyethylene. However, the thickness of the sheath need be no greater than is required to protect the surface of the optical fibre member and need not be chosen with a view to providing a high tensile strength for the fibre unit.

The fibre unit may have no significant reinforcement, but if it does then the reinforcement must be such as will not add greatly to the weight per unit length of the fibre unit. One form of reinforcement which may be used is a thread made of Kevlar (Registered Trade Mark). A suitable Kevlar thread will preferably not have a weight per unit length of greater than 0.15 g/m, and may have a weight per unit length of as little as 0.05 g/m whilst still providing significant reinforcement.

The tube should be one which exerts a low resistance to the fibre unit being pulled through it, and attention is directed to U.S. Pat. No. 4,892,442 for a description of tubes suitable for this purpose, such tubes having an inner layer which is impregnated with a highly lubricious material. U.S. Pat. No. 4,892,442 (which is incorporated herein by reference) describes, by way of example, the use for the inner layer of Teflon (Registered Trade Mark for polytetrafluoroethylene) silicone impregnated polyethylene, and graphite impregnated polyethylene. Where an impregnated polyethylene is used this is preferably a high density polyethylene. It should be noted that rather than using a tube lined with a material impregnated with a lubricious agent, one could use a tube formed of such a material throughout its cross section.

In order to insert the lightweight fibre unit into a tube by pulling, it is necessary that the tube should first have a pulling member located therein, and extending along the length of the tube, and that there should be a suitable means for attaching the trailing end of the pulling member to the leading end of the fibre unit.

The first of these requirements can be met by manufacturing a tube and then installing the pulling member therein, for example by blowing. However, it is preferred to manufacture the tube with the pulling member therein. Techniques for manufacturing a large diameter tube (typically about 20–25 mm internal diameter) with a pulling member therein are already known, and involve simultaneously extruding the tube through an annular die and feeding the pulling member through a circular hole which the annular die surrounds. Such techniques can readily be adapted to produce a tube/pulling assembly of a size more appropriate to the installation of a single lightweight optical fibre unit, say one having an internal diameter of from 1 or 1.5 mm to 10 mm. It is to be noted, however, that the fibre unit would normally have a diameter of from 0.5 mm to 1.5 mm, though somewhat larger for high fibre counts (e.g. 19-fibre units), and that the internal diameter of the tube need not exceed the outside diameter of the fibre unit by as large an amount as is needed when blowing is used. In blowing a fibre unit, a relatively large clearance is necessary, at least partly because of the need to ensure that there is an adequate fluid flow path along the whole tube. There are no such constraints when a fibre unit is being pulled. By way of example, an optical fibre unit having an external diameter of 1.1 mm should be capable of satisfactory installation by means of the invention in a tube having an internal diameter of 3.5 mm or less, say as little as about 2.5 mm, over distances of at least 1000 m.

The second of the above requirements, for a suitable means of attaching the pulling member to the fibre unit, can conveniently be met by a braided sheath. Braided sheaths are already known for connecting large diameter cables to pulling members, but such known sheaths are far too large to be suitable for present purposes. However, small diameter braided sheaths are widely available for an entirely unrelated purpose, namely leaders as in fly fishing, and it has been surprisingly found that such leaders can be used, without modification, in the method of the present invention.

In their simplest form, the material for such leaders is supplied to the user as a continuous reel, and the required length is cut off as required. For present purposes, a length of about 40 to 90 mm is sufficient. The ends of the pulling member and optical fibre unit are each inserted in a respective end of the braided sheath, and when tension is exerted in a direction tending to pull the pulling member and optical fibre unit away from one another and out of the sheath, the friction between the pulling member and the sheath and between the fibre unit and the sheath tends to elongate the sheath and thereby cause it to contract and grip the ends. However, friction by itself is not normally sufficient, and additional means, for example a small quantity of adhesive, preferably a rapidly setting adhesive such as a cyanoacrylate, may be used to ensure an adequate grip. Preferably, the length of pulling member inserted in the sheath, and the length of optical fibre unit inserted in the sleeve, is equal to at least 20 times its own diameter.

However, fly fishing leaders are also available as individual sheaths which have one open end and one end formed into a loop. Such leaders are particularly convenient for the purposes of the present invention in conjunction with fibre units which have one or more threads of Kevlar or other material therein. The pulling member can be inserted into the open end, and the Kevlar can be tied to the loop. This ensures that substantially the whole of the tension in the fibre unit is carried in that thread or threads, thus further reducing the risk of damaging the optical fibre member (or members) which remains substantially untensioned. Some optical fibre units are provided with a rip cord, and in such cases the end of the rip cord may be attached to the braided sheath for the purpose of pulling.

DETAILED DESCRIPTION OF THE PREFERRED EMBODIMENTS

Figure 1:
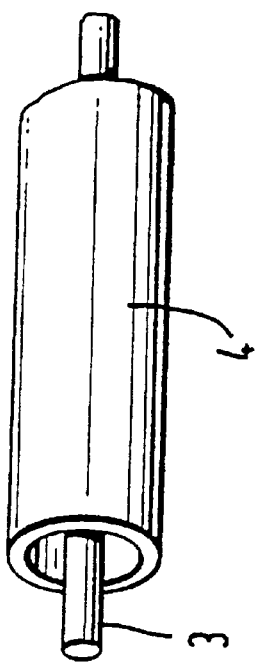
FIGS. 1 and 2 show diagrammatically, and not to scale, the method of the present invention as carried out using the two forms of sheath described above, and a monofilament pulling member.
Figure 2:
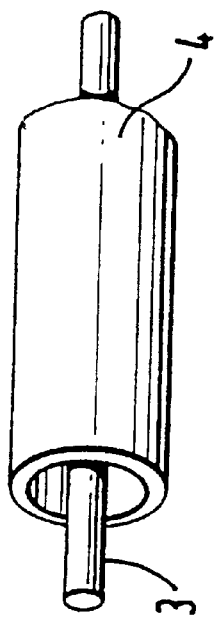

In FIGS. 1 and 2 the fibre unit is denoted by reference numeral 1, the braided sheath by reference numeral 2, a monofilament pulling member by reference numeral 3, the tube by reference numeral 4, and the Kevlar thread (FIG. 2 only) by reference numeral 5.

The invention has been described above in relation to the pulling of a single fibre unit into a single tube. However, it can also be used to pull simultaneously a plurality of units into a single tube, a plurality of units into a corresponding plurality of tubes, or a plurality of units into a lesser plurality of tubes. In each of these cases, the leading ends of the pulling members of the fibre units can be pulled by a single pulling apparatus (e.g. a drum), for which purpose the leading ends of the pulling members may be attached to one another.

It should also be noted that, as a modification of what is described above, the entire pulling member may be a braided tube, rather than having just a short length of braided tube acting as a connector to some other form of pulling member.

Also, a flow of air or other gas might be used to supplement the effect of the pulling member. This could be achieved, for example, using a simple gas bottle or compressor connected to the tube with a seal around the fibre unit and the tube. A very low volume of gas, e.g. 0.3 1/min would be used, so that the gas and fibre unit were travelling at more or less the same linear speed (say 28 m/min). In such a case the gas flow is not intended to provide any substantial part of the installation force, unlike the method described in JP-A-63-124005 referred to above.

Some examples will now be given of installations carried out by means of the method of the present invention.

EXAMPLE 1

A lightweight fibre unit having a weight of about 0.78 g/m, a diameter of about 0.93 mm and a structure as illustrated in EP-A-345968 (a single buffered fibre including an outer coating of UV-cured acrylate with protuberances therein produced by particles in the form of hollow glass microspheres), was installed in a tube having an internal diameter of 3.5 mm. The tube had an internal layer of a highly lubricious material, as described in U.S. Pat. No. 4,892,442. The inner surface of the tube was smooth. U.S. Pat. No. 4,892,442 describes, as one option, the use of a tube with ribs on the inner surface, but we prefer not to use such ribs where, as here, the fibre unit has protuberances on its outer surface. The tube, which had a pull cord formed therein at the time of manufacture, ran twice around the internal wall of a room 4 m×2 m, with bends 48 mm in radius at each corner, i.e. it was just under 24 m in length.

The fibre unit was initially contained in a fibre pan, and its free end was connected at one end of the tube to one end of the pull cord. The other end of the pull cord was attached to a pulling device, which pulled the pull cord from the tube, thereby pulling the fibre unit into the tube. This operation was carried out at three different pulling speeds, and the maximum tension occurring during each of the three pulls was as follows:

| Pulling speed | Tension |
| --- | --- |
| 28 m/m | 225 g |
| 15 m/m | 160 g |
| 5 m/m | 100 g |

All three tension values were well below the breaking tension of the fibre unit, and well below the value at which the tension might begin to adversely affect the optical and other properties of the fibre unit.

EXAMPLE 2

Figure 3:
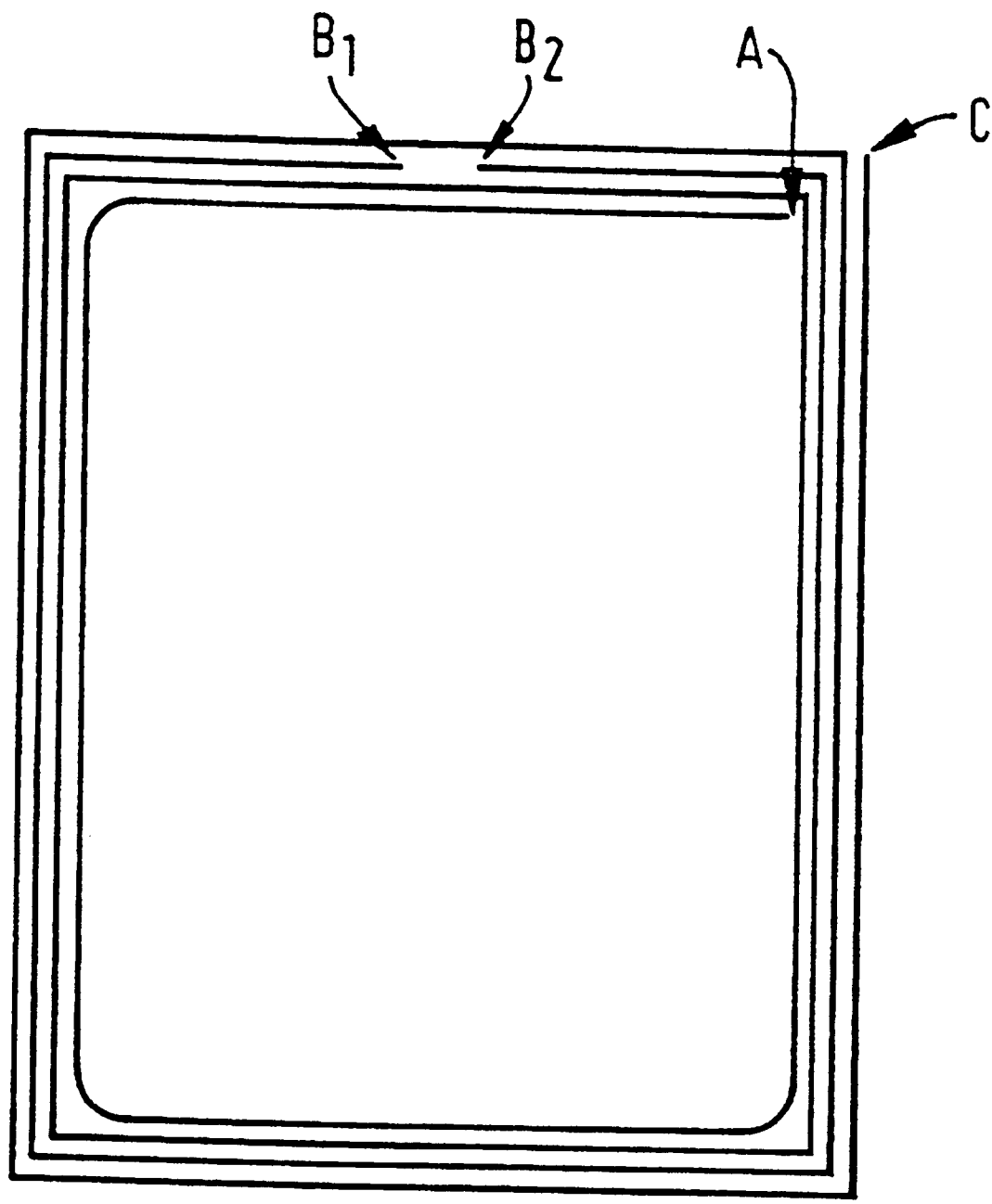
FIG. 3 shows the route used in one of the tests, described herein, of the method of the invention.

A longer length of the same type fibre unit as that used in Example 1 was installed in two longer lengths of the same type of tube as that used in Example 1. The installation route is shown diagrammatically in FIG. 3 of the drawings. The lines represent the two tubes. They are shown as being in a spiral formation, but that is purely for ease of illustration, and the tube runs along each of the four sides of the room in which the tubes were located were in fact vertically above one another. The longer sides of the room were each 47 m in length, and the shorter sides were 20 m. The first tube ran from point C to point $B_1$, and the second tube ran from point $B_2$, adjacent $B_1$, to point A. At the corners of the room the tubes went through bends having a radius of curvature of 250 mm.

A length of the fibre unit of at least about 570 m was coiled in a pan, and one end thereof was attached at A to the pull cord in the first tube. A pulling device was attached to the other end of the pull cord at $B_1$, and pulling was effected until the whole of the pull cord had emerged from the first tube followed by about 300 m of fibre unit. The pull cord was allowed to fall on the floor, and disconnected from the fibre unit to which it was attached, but the emerging fibre unit was coiled in a second pan. The operation was carried out at a speed of 33 m/m, taking about 8 minutes. The final pull tension (the tension increases as more fibre enters the tube, so this was the maximum tension) was 120 g.

The second pan, with its 300 m of fibre unit therein was then turned over, to expose the leading end of the fibre unit. This was then attached at point $B_2$ to the pull cord in the second tube. The pulling device was attached to the other end of the same pull cord, at point A, and pulling was carried out until all the fibre unit in the second pan had been pulled into the second tube, with about 30 m protruding from the tube at point A. This pulling was carried out at 30 m/m, and the final tension was 120 g. On completion there was a continuous length of about 540 m of fibre unit in the first and second tubes, running along a route C, $B_1$, $B_2$, A, with the fibre unit extending straight across from $B_1$ to $B_2$. The gap between $B_1$ and $B_2$ was then closed with a closure member, so that the fibre unit was completely enclosed along its whole length.

By way of a test, the pulling device then began to pull the 540 m length of installed fibre unit out of the combined tube lengths at 27 m/m. The initial tension (and therefore the maximum tension) was found to be 400 g.

EXAMPLE 3

The same light fibre unit and tube used in Examples 1 and 2 were used in a route which ran a total distance of 1055 m. A single tube extended from a pan at one end along a 635 m length sloping downwards at 3°, then through a 90° bend having a radius of curvature of 600 mm, and finally uphill at 3° for 420 m to a pulling device. Pulling was carried out for most of the pull at 28 m/m, and took a total of 43 minutes. The following table gives the pulling speed and tension for various distances of the leading end of the fibre unit down the tube.

| DIST (m) | SPEED m/m | Tension g |
| --- | --- | --- |
| 300 | 28 | 980 |
| 600 | 27 | 1183 |
| 900 | 26 | 1250 |
| 1000 | 26 | 1260 |
| 1030 | 15 | 916 |
| 1055 | 7/0 | 716 |

The notation 7/0 against 1055 m denotes the fact that over the last meter the speed fell from 7 m/m to zero.

What is claimed is:

1. A method of installing an optical fibre unit in a tube with a route including at least one significant bend, said fibre unit having a weight less than or equal to approximately 5 g/m, comprising:

attaching a pulling member to one end of the fibre unit; and exerting a pulling force on the pulling member;

in which method said pulling force provides at least substantially all installation force for installing the fibre unit;

wherein the fibre unit is not reinforced.

2. A method according to claim 1, further comprising the step of providing an air flow along the tube during installation.

3. An optical fibre transmission path manufactured by installing an optical fibre unit in a tube by the method of claim 1.

4. A method according to claim 1, wherein the fibre unit has a weight less than or equal to approximately 2 g/m.

5. A method of installing an optical fibre unit in a tube with a route including at least one significant bend, said fibre unit having a weight less than or equal to approximately 5 g/m, comprising:

attaching a pulling member to one end of the fibre unit; and exerting a pulling force on the pulling member;

in which method said pulling force provides at least substantially all installation force for installing the fibre unit;

wherein the pulling member exerts a pulling force on the fibre unit.

6. A method of installing an optical fibre unit in a tube with a route including at least one significant bend, said fibre unit having a weight less than or equal to approximately 5 g/m, comprising:

attaching a pulling member to one end of the fibre unit; and exerting a pulling force on the pulling member to provide all installation force for installing the fibre unit;

in which method none of the installation force for installing the fibre unit is provided by a flow of gas.

wherein the pulling member exerts a pulling force on the fibre unit.

7. A method of installing an optical fibre unit in a tube with a route including at least one significant bend, said fibre unit having a weight less than or equal to approximately 5 g/m, comprising the steps of:

attaching a pulling member to one end of the fibre unit; and exerting a pulling force on the pulling member to provide all installation force for installing the fibre unit;

in which method the fibre unit is free from any other installation force;

wherein the pulling member exerts a pulling force on the fibre unit.

8. A method of installing an optical fibre unit in a tube with a route including at least one significant bend, said fibre unit having a weight less than or equal to approximately 5 g/m, comprising the steps of:

attaching a pulling member to one end of the fibre unit; and exerting a pulling force on the pulling member to provide at least substantially all installation force for installing the fibre unit, the remaining installation forced imposed on the fibre unit during installation being provided by a flow of gas having a pressure less than approximately 7 Kg/cm2;

wherein the pulling member exerts a pulling force on the fibre unit.

9. A method of installing an optical fibre unit in a tube, comprising:

installing an elongate pulling member in the tube;

attaching the optical fibre unit and the pulling member together by a braided sheath, the braided sheath being inserted over at least one of an end of the fibre unit and an end of the elongate pulling member; and exerting a pulling force on the pulling member to provide an installation force for installing the fibre unit into the tube.

10. The method in accordance with claim 9, wherein the optical fibre unit has a weight of less than or equal to approximately 10 gm/cm.

11. The method in accordance with claim 9, wherein the optical fibre unit has a weight of less than or equal to approximate 5 gm/cm.

12. The method in accordance with claim 9, wherein the optical fibre unit has a weight of less than or equal to approximate 2 gm/cm.

13. The method in accordance with claim 9, wherein the pulling unit comprises a monofilament.

14. The method in accordance with claim 9, wherein the optical fibre unit has a diameter between approximately 1.0 mm and approximately 10 mm.

15. The method in accordance with claim 9, wherein the braided sheath has a length between approximately 40 mm and approximately 90 mm.

* * * * *

UNITED STATES PATENT AND TRADEMARK OFFICE
CERTIFICATE OF CORRECTION

PATENT NO. : 6,385,378 B1
DATED : May 7, 2002
INVENTOR(S) : George Henry Platt Brown and John Tansey It is certified that error appears in the above-identified patent and that said Letters Patent is hereby corrected as shown below:

<u>Title page,</u>
Item [73], Assignee, delete "Emtelle UK Limited, Jedburgh; BICC Public Limited Company, Roxburghshire; Corning Limited, London, all of United Kingdom --.

Signed and Sealed this

Third Day of December, 2002

JAMES E. ROGAN
*Director of the United States Patent and Trademark Office*

UNITED STATES PATENT AND TRADEMARK OFFICE
CERTIFICATE OF CORRECTION

PATENT NO. : 6,385,378 B1 Page 1 of 1
DATED : May 7, 2002
INVENTOR(S) : George Henry Platt Brown and John Tansey It is certified that error appears in the above-identified patent and that said Letters Patent is hereby corrected as shown below:

<u>Title page,</u>
Item [73], Assignee, should read -- Emtelle UK Limited, Jedburgh; BICC Public Limited Company, Roxburghshire; Corning Limited, London, all of United Kingdom --.

This certificate supersedes Certificate of Correction issued December 3, 2002.

Signed and Sealed this

Twenty-fifth Day of February, 2003

JAMES E. ROGAN
*Director of the United States Patent and Trademark Office*